(12) United States Patent
Schrempp et al.

(10) Patent No.: US 11,957,291 B2
(45) Date of Patent: Apr. 16, 2024

(54) SYSTEM FOR LOADING AT LEAST ONE TRANSPORT DISHWASHER WITH ITEMS TO BE WASHED, ARRANGEMENT OF AT LEAST ONE TRANSPORT DISHWASHER AND A LOADING SYSTEM AND METHOD FOR LOADING AT LEAST ONE TRANSPORT DISHWASHER WITH ITEMS

(71) Applicant: ILLINOIS TOOL WORKS INC., Glenview, IL (US)

(72) Inventors: Martin Schrempp, Biberach (DE); Harald Disch, Elzach (DE); Adrian Boldt, Offenburg (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 161 days.

(21) Appl. No.: 17/325,438

(22) Filed: May 20, 2021

(65) Prior Publication Data
US 2021/0369079 A1 Dec. 2, 2021

(30) Foreign Application Priority Data
May 28, 2020 (DE) ...................... 10 2020 114 364.8

(51) Int. Cl.
*A47L 15/42* (2006.01)
*A47L 15/24* (2006.01)
*A47L 15/46* (2006.01)

(52) U.S. Cl.
CPC ......... *A47L 15/4295* (2013.01); *A47L 15/241* (2013.01); *A47L 15/248* (2013.01);
(Continued)

(58) Field of Classification Search
CPC ....... G06T 7/00–97; A47L 15/241–245; A47L 15/00–508; A47L 15/247; A47L 15/4295;
(Continued)

(56) References Cited

U.S. PATENT DOCUMENTS 6,530,996 B2 3/2003 Vaerpioe
2010/0043834 A1 2/2010 Scheringer
(Continued)

FOREIGN PATENT DOCUMENTS

DE 4331244 A1 3/1995
DE 112017004082 T5 5/2019
(Continued)

*Primary Examiner* — Natasha N Campbell
*Assistant Examiner* — Richard Z. Zhang
(74) *Attorney, Agent, or Firm* — THOMPSON HINE LLP

(57) ABSTRACT

A system (10) for loading at least one conveyor warewasher (1, 1') with washware includes a feed conveyor belt (11) for delivering washware to at least one loading region of the conveyor warewasher (1, 1') and a detection system (15), in particular an optical one, configured to detect at least one of the following parameters of the washware on the feed conveyor belt (11) when delivering the washware (9a, 9b, 9c) to the loading region: (i) a type of the washware, (ii) a degree of soiling of the washware, and/or (iii) an order of the washware and/or an alignment of the washware relative to the feed conveyor belt (11). The detection system (15) has an assigned evaluation device, which is configured to control the delivery of the washware to the at least one loading region as a function of at least one of the detected parameters.

9 Claims, 3 Drawing Sheets

(52) U.S. Cl.
CPC ........... *A47L 15/46* (2013.01); *A47L 2401/04* (2013.01); *A47L 2401/34* (2013.01); *A47L 2501/24* (2013.01); *A47L 2501/30* (2013.01); *A47L 2501/36* (2013.01)

(58) Field of Classification Search
CPC ....... A47L 15/0076; A47L 2401/00–34; B65G 15/30–58; B08B 3/022; B08B 3/041; B08B 3/123
See application file for complete search history.

(56) References Cited

U.S. PATENT DOCUMENTS

| | | |
|---|---|---|
| 2019/0167068 A1 | 6/2019 | Yoon |
| 2023/0012018 A1* | 1/2023 | Scheringer .......... A47L 15/0076 |

FOREIGN PATENT DOCUMENTS

| | | |
|---|---|---|
| EP | 2158833 A2 | 3/2010 |
| WO | WO 2012173479 A1 | 12/2012 |
| WO | WO 2020163140 A1 | 8/2020 |
| WO | WO 2021116363 A1 | 6/2021 |

* cited by examiner

SYSTEM FOR LOADING AT LEAST ONE TRANSPORT DISHWASHER WITH ITEMS TO BE WASHED, ARRANGEMENT OF AT LEAST ONE TRANSPORT DISHWASHER AND A LOADING SYSTEM AND METHOD FOR LOADING AT LEAST ONE TRANSPORT DISHWASHER WITH ITEMS

TECHNICAL FIELD

The present invention relates generally to the field of industrial washing. In particular, the invention relates to a conveyor warewasher assembly and a system for loading at least one conveyor warewasher with washware. The invention further relates to a method for loading at least one conveyor warewasher with washware.

BACKGROUND

Conveyor warewashers of the conveyor warewasher arrangement according to the invention are, in particular, commercial conveyor warewashers and can be configured as belt conveyor warewashers or as rack conveyor warewashers.

Conveyor warewashers are used in the commercial sector. Unlike domestic dishwashers, in which the dishes to be cleaned remain stationary in the machine during cleaning, in conveyor warewashers the washware is conveyed through different treatment zones of the machine.

In conveyor warewashers, the washware, such as trays, dishes, pots, glasses, cutlery and other utensils to be cleaned, are conveyed through a number of treatment zones, such as prewash zone(s), main wash zone(s), postwash or prerinse zone(s), final rinse zone(s) and drying zone(s). A conveyor apparatus is used to transport washware in a conveying direction through the conveyor warewasher, which usually comprises at least one conveyor track with compartments for receiving washware. In a belt conveyor warewasher, the compartments can be formed by support fingers on a conveyor belt of the conveyor apparatus, which defines the conveyor track. In rack conveyor warewashers, dish racks, in which compartments can be configured to receive the washware to be treated, serve as the conveyor apparatus. Here, it is conceivable for the dish racks to be conveyed through the rack conveyor warewasher by means of a conveying device of a conveyor track.

The washware to be cleaned is typically presorted before being placed into the conveyor belt. A rack conveyor warewasher is known from publication U.S. Pat. No. 6,530,996 B2, for example, in which the washware to be treated is delivered to the respective treatment zones after being presorted in dish racks.

Conveyor warewashers are used in particular in large facilities such as dining halls and cafeterias in order to clean large quantities of soiled washware as economically as possible. With the conveyor warewashers of the currently known type, it is possible to clean several hundred place settings per hour. Studies have shown that, on average, each place setting typically consists of a tray, a plate, one or two bowls, a drinking glass, and a set of cutlery.

In almost all large kitchens, such as company cafeterias or dining halls, the washware used by the meal participants (dishes, drinking glasses, cutlery, etc.) is returned on trays. From the return station, the place settings are conveyed to the washing region. The place settings are typically conveyed by a corresponding feed conveyor belt. The place setting is conveyed by a conveyor belt from the return station into the washing region directly to a loading region of the conveyor warewasher.

In the loading/intake region of the conveyor warewasher, the washware pieces are then usually removed manually by service personnel and sorted into the conveyor belt of the conveyor warewasher.

With respect to trays or tray-like articles, presorting is usually carried out in such a way that the set of dishes and cutlery is removed manually from a tray to be cleaned by the service personnel, and the tray is then stacked in front of the conveyor apparatus or in the intake region (soiled side) of the conveyor warewasher. From time to time, the trays from this stack of trays are placed only with other trays into the conveyor belt of the conveyor warewasher and cleaned.

This homogenous approach has the advantage that trays cannot cast a spray shadow on smaller washware pieces stacked behind the trays. This approach also makes the work flow of stacking and unstacking much easier and more efficient than mixing the washware in with the trays to be cleaned.

However, while the trays from this stack of trays are placed only with other trays into the conveyor belt of the conveyor warewasher and cleaned, it is not possible to clean other washware, such as plates, bowls, or other dishes, because the trays to be placed into the conveyor belt must usually be placed into the conveyor belt transverse to the conveying direction and thus fill the entire available surface of the conveyor belt. Therefore, compared to other types of washware, a relatively large amount of time must be spent cleaning trays.

Furthermore, the service personnel of the conveyor warewasher must include each tray in their work flow at the machine inlet twice: the first time when removing the cutlery and dishes from the tray to be cleaned, and the second time when actually placing the trays into the conveyor belt of the conveyor warewasher.

In the described work process, the manual effort is particularly high. Each piece of washware (dish) of each place setting must be individually removed manually from the tray and placed into the conveyor belt of the warewasher.

Furthermore, the individual pieces of cutlery of each place setting must be removed manually from the tray and likewise delivered to the conveyor warewasher. This is followed by the previously described treatment of the actual trays.

With a machine capacity of several thousand plates per hour, it is in particular important to work as quickly and efficiently as possible, which increases the physical strain on the service personnel.

SUMMARY

Based on this situation, the underlying problem of the present invention is to provide a solution for conveyor warewashers of the type mentioned at the outset, in which it is possible to configure the entire washing and rinsing process more efficiently, as a result of which, in particular, the working time of the washing personnel can be decreased and the consumption of resources of the warewasher can be reduced.

Accordingly, the invention relates in particular to a system for loading at least one conveyor warewasher with washware, wherein the loading system comprises a feed conveyor belt for delivering washware to at least one loading region of the at least one conveyor warewasher.

According to the invention, a detection system is provided in particular, which is preferably embodied as an optical detection system and is configured to detect at least one of the following parameters of the washware on the feed conveyor belt when delivering the washware to the at least one loading region of the at least one conveyor warewasher:

i) a type of at least one piece of washware and/or a relative position of the at least one piece of washware on the feed conveyor belt;
ii) a degree of soiling of at least one washware piece on the feed conveyor belt;
iii) an order of the washware on the feed conveyor; and/or
iv) a relative alignment of at least one piece of washware on the feed conveyor belt, namely relative to the feed conveyor belt.

The detection system is advantageously configured to directly detect at least one of the aforementioned parameters of the washware. For this purpose, it is useful for the detection system to comprise a washware detector apparatus that serves to detect at least one of the aforementioned parameters of at least one piece of washware.

The term "washware detector apparatus" as used herein is understood to be any detection apparatus that is designed to detect or determine at least one of the aforementioned parameters of the washware delivered via the feed conveyor belt. Here, it is conceivable in particular that the washware detector apparatus comprises at least one detector device with which at least one of the following parameters can be detected:

a) a size of at least one piece of washware of the delivered via the feed conveyor belt;
b) a shape of at least one piece of washware delivered via the feed conveyor belt;
c) the material of at least one piece of washware delivered via the feed conveyor belt;
d) the relative position of at least one piece of washware delivered via the feed conveyor belt with respect to, for example, an edge region of the feed conveyor belt and/or with respect to a marking, for example, of the feed conveyor belt;
e) a degree of soiling of at least one piece of washware delivered via the feed conveyor belt;
f) the order of a group of washware pieces delivered via the feed conveyor belt; and/or
g) the relative alignment of at least one piece of washware delivered via the feed conveyor belt.

According to conceivable implementations, the washware detector apparatus can comprise at least one preferably optically, inductively, or capacitively operating detector device, so that the size, the shape, the material, degree of soiling, relative position, order, and/or relative alignment of the individual washware pieces can be detected for the purposes of identifying one of the aforementioned parameters.

In particular, inductively operating proximity sensors, light scanners, light curtains, laser scanners, 3D-laser, cameras, rotary encoders, or a combination thereof are considered as the detector device.

In preferred embodiments of the loading system according to the invention, the detection system comprises at least one camera system for optically detecting at least one of the aforementioned parameters.

In the loading system according to the invention, it is provided in particular that the aforementioned detection system has an assigned evaluation device, which is configured to control the delivery of the washware delivered via the feed conveyor belt or at least one piece of washware delivered via the feed conveyor belt to the at least one loading system as a function of at least one parameter detected by means of the detection system.

The term "control of the delivery of the washware to the at least one loading system" as used herein is understood in particular to mean that, as a function of at least one parameter detected using the detection system, the delivery of at least one piece of washware delivered via the feed conveyor belt to the at least one loading system is allowed or prohibited, i.e. in particular actively prevented.

According to further developments of the loading system according to the invention, the latter additionally has a loading arrangement with at least one manipulator, which is configured to automatically remove washware from the feed conveyor belt and place it on at least one conveyor track of the at least one conveyor warewasher.

In particular, the at least one manipulator of the loading arrangement optionally belonging to the loading system according to the invention is configured to automatically remove washware from the feed conveyor belt and, in particular, place it on a dedicated conveyor track of the at least one conveyor warewasher, namely when the evaluation device assigned to the detection system detects that a delivery of the washware or a delivery of the at least one piece of washware delivered via the feed conveyor belt to the at least one loading region of the at least one conveyor warewasher is to be allowed.

In embodiments of the loading system according to the invention, in which the one corresponding loading arrangement is provided, it is useful for the evaluation device assigned to the detection system to be further or optionally configured to actuate the at least one manipulator of the loading arrangement accordingly, in order to control the manipulator of the loading arrangement accordingly, in particular as a function of at least one parameter detected using the detection system, so that the washware or the at least one piece washware delivered via the feed conveyor belt is detected by the manipulator and, in particular, placed appropriately on at least one conveyor track of the at least one conveyor warewasher.

With the loading system according to the invention, the conveyor warewasher arrangement preferably consisting of multiple conveyor warewashers can be configured with a variety of expansion stages for the automation of manual loading and unloading work steps.

A first expansion stage can consist of the conveyor warewasher arrangement having only one conveyor warewasher, wherein, in addition to a main conveyor belt, the one conveyor warewasher of the conveyor warewasher arrangement also has, for example, a tray track (tray conveyor belt), wherein this tray track is preferably arranged parallel to the main conveyor belt.

In this expansion stage, the place settings, for example, are placed directly onto the feed conveyor belt of the loading system by either the meal participant or the washing personnel, as already described. If, with the aid of the detection system, it is detected that the delivery of the washware placed on the feed conveyor belt to the at least one loading region of the at least one conveyor warewasher is to be allowed, the feed conveyor belt then conveys the place settings to the delivery/loading region of the at least one conveyor warewasher. There, for example, the cutlery and dishes can then be removed manually from the trays. The manually removed dishes can then be manually sorted into the main conveyor belt of the conveyor warewasher. The removed pieces of cutlery can be collected in racks and subsequently cleaned in the conveyor warewasher.

With the first expansion stage, the trays are no longer sorted into the warewasher manually. They are conveyed further, for example in parallel, via the feed conveyor belt in the direction of the machine intake of the at least one conveyor warewasher and there automatically placed into a special tray conveyor belt (tray track), for example via a single cycle apparatus or a setting apparatus. This tray track preferably runs parallel to the main conveyor belt.

According to a second expansion stage, a separate cutlery track can be provided in addition to the aforementioned tray track. This cutlery track preferably likewise runs parallel to and directly adjacent to the tray track. However, in this context, it is also conceivable that the tray track is part of a conveyor apparatus of a first conveyor warewasher of the conveyor warewasher arrangement and that the cutlery track is part of a conveyor apparatus of a second conveyor warewasher of the conveyor warewasher arrangement.

As previously described, the place settings can be conveyed to the intake or loading region of one of the conveyor warewashers of the conveyor warewasher arrangement via the feed conveyor belt of the loading system. In this second expansion stage, now only the dishes and glasses have to be removed manually from the delivered trays and sorted into a main conveyor belt of the conveyor warewasher or into a main conveyor belt of a further conveyor warewasher.

The tray and the cutlery on it remain on the feed conveyor belt. Said tray is conveyed further to a single cycle apparatus for cutlery, for example a cutlery lifting magnet. Here, the pieces of cutlery can be automatically removed from the trays and placed into a cutlery track of one of the conveyor warewashers of the conveyor warewasher arrangement. The tray is then conveyed to the single cycle apparatus, where it is automatically loaded into a tray track of one of the conveyor warewashers of the conveyor warewasher arrangement.

To further reduce the manual handling steps necessary for loading the at least one conveyor warewasher of the conveyor warewasher arrangement, it is provided according to further developments of the loading system according to the invention that plates and bowls can also be automatically sorted into the at least one conveyor warewasher and in particular into a main conveyor belt of the at least one conveyor warewasher.

In this way, manual work steps and thus the workload for the washing personnel can be reduced overall, because, ideally, the washing personnel no longer have to load the conveyor warewasher(s) manually. The loading system according to the invention in particular ensures the most ergonomic and user-friendly operation of the at least one conveyor warewasher possible, because a manual loading of the washware into the conveyor warewasher(s) is no longer necessary.

In addition to this, the loading system according to the invention improves the cleaning result of the warewasher arrangement, because all washware of a defined washware group is uniformly aligned on a conveyor track of the at least one conveyor warewasher provided for this washware.

It is also possible to simplify the unloading process, because each washware group can be transported through the at least one conveyor warewasher of the conveyor warewasher arrangement on a defined conveyor track, and thus arrives at the unloading region of the conveyor warewasher arrangement already presorted.

According to the implementations of the loading system according to the invention, it is provided that the detection system is configured to detect at least one type of washware of the following types of washware when delivering the washware to the at least one loading region of the at least one conveyor warewasher, in particular on the basis of the size, the shape, and/or the material of the washware:
 a first washware type comprising cutlery and/or pieces of cutlery made of a metal, in particular stainless steel;
 a second washware type comprising containers, in particular Gastronorm (GN) containers and/or pots made of a metal, in particular stainless steel;
 a third washware type comprising trays or tray-like articles made of a plastic material; and
 a fourth washware type comprising dishes, in particular plates, cups, and/or bowls, made of porcelain, a porcelain-like material, or earthenware; and/or
 a fifth washware type comprising dishes and/or glasses, in particular drinking glasses, made of glass or a glass-like material.

According to embodiments, the evaluation device is configured in in particular to actuate the at least one manipulator of the loading arrangement as a function of a detected washware type in such a manner that the washware of the detected washware type is removed from the feed conveyor belt by the at least one manipulator and placed on a conveyor track, in particular one that is assigned to the detected washware type, of the at least one conveyor warewasher.

In this context, it is conceivable that the loading arrangement optionally belonging to the loading system has a plurality of manipulators, wherein each manipulator of the loading system is assigned to at least one predetermined or determinable washware type, in particular at least one of a predetermined or determinable washware type of the types described above, and/or is configured to grip washware of at least one predetermined or determinable washware type, in particular at least one of a predetermined or determinable washware type of the types described above, from the feed conveyor belt and to place the gripped washware preferably automatically on one of the dedicated conveyor tracks of the at least one conveyor warewasher, said conveyor tracks being assigned to the washware.

According to embodiments of the loading system according to the invention, the sorting arrangement is not only configured to determine the type of washware delivered via the feed conveyor belt automatically, but also by means of the additional functionality, according to which it is designed to assign each detected type of washware to a previously determined or determinable washware group.

For example, the sorting arrangement is configured to sort the washware carried via the feed conveyor belt according to at least the following washware group:
 a first washware group comprising cutlery and/or pieces of cutlery made of a metal, in particular stainless steel;
 a second washware group comprising trays or tray-like articles made of a plastic material; and
 a third washware group comprising dishes, in particular plates, cups, and/or bowls, made of porcelain or a porcelain-like material.

With the aid of this classification, care is taken to ensure that washware of different types of washware, which can be sorted into identical conveyor tracks in the intake or loading region of the conveyor warewasher arrangement, is combined into one washware group.

In particular, it is advantageous that the loading arrangement has a variety of manipulators, which are configured to successively detect and/or grasp the washware delivered via the feed conveyor belt and then sort the washware into dedicated conveyor tracks of the at least one conveyor warewasher. These manipulators are preferably arranged one behind the other, at least in regions, looking in the conveying direction of the feed conveyor belt.

In order for the automatic loading system to operate fully automatically, one washware group is assigned to the individual manipulators of the loading system, respectively.

For example, the loading arrangement has at least one first manipulator, which is configured to preferably automatically load a first conveyor track of one of the conveyor warewashers of the conveyor warewasher arrangement with washware of the first washware group, wherein the loading assembly preferably further has at least one second manipulator, which is configured to preferably automatically load a second conveyor track of one of the conveyor warewashers of the conveyor warewasher arrangement with washware of the second washware group, and wherein the loading system further preferably has at least one third manipulator, which is configured to preferably automatically load a third conveyor track of one of the conveyor warewashers of the conveyor warewasher arrangement with washware of the third washware group.

In order to be compatible with the two previously described expansion stages for the automation of manual loading and unloading work steps the at least one third manipulator is preferably—looking in the conveying direction of the feed conveyor belt—arranged upstream of the first and second manipulator, wherein the first manipulator is preferably arranged upstream of the second manipulator.

According to preferred implementations of the loading system according to the invention, the at least one third manipulator of the loading arrangement, which is preferably configured to automatically load a conveyor warewasher of the conveyor warewasher arrangement or a dedicated conveyor track of a conveyor warewasher of the conveyor warewasher arrangement with washware of the third washware group, is configured to grip the washware of the third washware group delivered via the feed conveyor belt, remove it from the feed conveyor belt, and set it down at a predetermined or determinable dedicated position.

This predetermined or determinable dedicated position is for example a region of a conveyor belt of a conveyor warewasher, in particular the main conveyor belt of a conveyor warewasher.

Alternatively, however, it is also conceivable that the predetermined or determinable dedicated position is in a region that is preferably located outside the conveyor warewasher and serves as a placement region for forming a stack of washware, in particular a stack of dishes.

According to preferred implementations of the loading system according to the invention, the at least one third manipulator has a gripper system with at least one set of gripping tongs and/or at least one suction gripper. The at least one third manipulator is configured to grip the washware of the third washware group delivered via the feed conveyor belt, remove it from the feed conveyor belt, and set it down at the aforementioned predetermined or determinable dedicated position, wherein said position is either a region of a conveyor belt, in particular the main conveyor belt, of a conveyor warewasher of the conveyor warewasher arrangement or a placement region outside of the conveyor warewasher.

The at least one third manipulator of the loading arrangement can optionally or additionally have an actuatable magnet for cutlery or pieces of cutlery, so that there is no need for a separately implemented cutlery lifting magnet.

In this context, it is conceivable for the at least one third manipulator to have a starting position, in which the gripper system of the at least one third manipulator is arranged above the feed conveyor belt such that, during their transport, washware of the third washware group is conveyed by the feed conveyor belt into the gripping region of the at least one set of gripping tongs and/or the at least one suction gripper.

The starting position of the at least one third manipulator is preferably selected such that, during transport, only washware of the third washware group, but not washware of the first or second washware group, are conveyed by the feed conveyor belt into the gripping region of the at least one set of gripping tongs and/or the at least one suction gripper. This can, for example, be implemented by vertically spacing the gripper system in a suitable manner from the plane in which the feed conveyor belt is located.

It is generally advantageous for the gripper system of the at least one third manipulator to be assigned to a corresponding sensor system, which is configured to detect the presence of at least one washware piece, and in particular at least one washware piece of the third washware group, in the gripping region of the at least one set of gripping tongs and/or in the gripping region of the at least one suction gripper. In this context, it is also conceivable that a suitable control device is provided, which is configured to initiate gripping by the at least one set of gripping tongs and/or the at least one suction gripper when the sensor system associated with the gripper system determines that at least one washware piece, and in particular at least one washware piece of the third washware group, is located in the gripping region of the at least one set of gripping tongs and/or in the gripping region of the at least one suction gripper.

In this context, it is useful for the evaluation device to further be configured to actuate the at least one third manipulator of the loading arrangement such that said manipulator removes the at least one washware piece gripped by the gripper system from the feed conveyor belt and sets it down at a predetermined or determinable dedicated position, such as on the main conveyor belt of a conveyor warewasher of the conveyor warewasher arrangement.

In a further development of the last mentioned embodiments, the gripper system of the at least one third manipulator has an assigned positioning aid comprising at least one guide element, wherein the at least one guide element is configured to preferably guide only washware of the third washware group delivered via the feed conveyor belt in the direction of the gripping region of the at least one set of gripping tongs and/or in the direction of the gripping region of the at least one suction gripper.

The gripper system can alternatively or additionally have an assigned preferably optically operating identification system to automatically identify the washware delivered via the feed conveyor belt, and in particular washware of the third washware group. In this embodiment, it is useful to provide a control device, which is configured to move the at least one third manipulator with the gripper system to the washware when the identification system identifies a piece of washware of the third washware group in the washware delivered via the feed conveyor belt.

According to further developments of the evaluation device, the latter is configured to interrupt or prohibit a delivery of at least one washware piece to the loading arrangement when the detection system detects that the washware piece does not belong to a predetermined or determinable washware type or when the washware is not allocable to a predetermined or determinable washware type with the detection system.

Alternatively or additionally, according to further developments of the loading system according to the invention, it is provided that the detection system is configured to detect a degree of soiling of the washware when delivering the washware to the at least one loading region of the at least one conveyor warewasher, wherein the evaluation device is configured, to allow or interrupt the delivery of the washware to the loading arrangement as a function of the degree of soiling detected, and/or wherein the evaluation device is configured to actuate the at least one manipulator of the loading arrangement as a function of the detected degree of soiling in such a way that the washware is removed by the at least one manipulator from the feed conveyor belt and—as a function of the degree of soiling detected—placed either on a conveyor track of the at least one conveyor warewasher or in a storage region external to the at least one conveyor warewasher and in particular at a precleaning station.

In this context, it is useful for the detection system to be configured to detect a degree of soiling of the washware when delivering the washware to the at least one loading region of the at least one conveyor warewasher, wherein the evaluation device is configured to allow or interrupt the delivery of the washware to the loading arrangement as a function of the degree of soiling detected, wherein the evaluation device is further configured, to interrupt the delivery of a washware piece to the loading arrangement when a degree of soiling is detected on the washware that exceeds a predetermined threshold value.

In the two aforementioned design variants, in particular, the feed conveyor belt can be configured to deliver the washware in batches, for example stored on a tray, to the at least one loading region of the at least one conveyor warewasher. Each batch can thus preferably comprise a tray, optionally with washware placed or stored on the tray, in particular at least one place setting.

The detection system can also be configured in particular to detect the at least one parameter of the washware per batch, wherein the evaluation device is configured to allow or interrupt the delivery of the batch to the loading arrangement as a function of the detected parameter of a batch.

Accordingly, according to preferred implementations of the invention, the feed conveyor belt is configured in particular to deliver the washware by batch to the at least one loading region of the at least one conveyor warewasher, wherein each batch preferably comprises a tray, optionally with washware placed or stored on the tray, in particular at least one place setting.

In this context, it is particularly useful for the detection system to be configured to detect an order of the washware per batch when delivering the washware by batch to the at least one loading region of the at least one conveyor warewasher, wherein the evaluation device is configured to allow the delivery of the batch of the washware to the loading arrangement as a function of the order detected.

Here, the evaluation device is preferably configured in particular to allow the delivery of the batch of the washware to the loading arrangement when the detection system detects that the washware is scattered in the batch.

According to further developments of this aspect, the evaluation device is configured to prohibit or interrupt the delivery of the batch of the washware to the loading arrangement when the detection system detects that a predetermined or determinable number of washware pieces is present in the batch in an overlapping manner at least in regions.

In embodiments of the loading system according to the invention, the detection system can be configured to detect an alignment of at least one of the washware pieces relative to the feed conveyor belt when delivering the washware to the at least one loading region of the at least one conveyor warewasher. Here, the evaluation device is configured in particular to allow or interrupt the delivery at least of the at least one washware piece to the loading arrangement as a function of the detected alignment of the at least one washware piece relative to the feed conveyor belt.

For example, the evaluation device is configured in particular to not allow or to interrupt the delivery to the loading arrangement when the detection system detects that the at least one washware piece deviates from at least one predetermined or determinable target alignment.

According to implementations of the loading system according to the invention, the feed conveyor belt has an assigned discharge switch. The at least one discharge switch is preferably arranged upstream of the at least one loading region of the at least one conveyor warewasher and downstream of the detection system.

The at least one discharge switch is configured in particular to discharge as needed at least one washware piece, and in particular washware pieces by batch, out of the feed conveyor belt. The evaluation device is preferably configured to actuate the discharge switch when a delivery of at least one washware piece to the loading arrangement is not allowable or is to be interrupted.

According to further developments, it is provided that the at least one discharge switch is configured to discharge as needed at least one washware piece, and in particular washware pieces by batch, out of the feed conveyor belt into an outlet region, wherein the outlet region is preferably configured for precleaning, in particular manually, of the washware that has been discharged into the outlet region.

Alternatively or additionally, it can be provided that the at least one discharge switch is configured to discharge as needed at least one washware piece, and in particular washware pieces by batch, out of the feed conveyor belt into a return conveyor belt, wherein the return conveyor belt is configured at least in regions for precleaning, in particular manually, of the at least one washware piece that has been discharged into the return conveyor belt.

Here, an upstream end region of the return conveyor belt is connected to at least one in-feed switch in a conveying manner for the loading, at least as needed, of the at least one precleaned washware piece into the feed conveyor belt. According to implementations of this aspect, it is useful for the at least one in-feed switch to preferably lead into the feed conveyor belt upstream of the detection system.

According to a further (alternative or additional) aspect of the invention, it is provided that the feed conveyor belt has at least one assigned in-feed switch, which is configured to load as needed at least one washware piece, and in particular washware pieces by batch, into the feed conveyor belt, wherein the at least one in-feed switch preferably leads into the feed conveyor belt upstream of the detection system. Preferably, the at least one in-feed switch connects in a conveying manner a region that is configured for manual precleaning, in particular, to the feed conveyor belt.

The invention further relates to an arrangement consisting of at least one conveyor warewasher and a loading system of the type according to the invention as described above.

Furthermore, the invention relates to a method of loading at least one conveyor warewasher with washware. In the method, washware is delivered to at least one loading region of the at least one conveyor warewasher, wherein at least one of the following parameters of the washware is detected upon delivery of the washware to the at least one loading region of the at least one conveyor warewasher:

i) a type of the washware and/or a relative position of the washware;
ii) a degree of soiling of the washware; and/or
iii) an order of the washware and/or an alignment of the washware.

The method according to the invention is characterized in particular in that, as a function of at least one of the detected parameters, a delivery of the washware to the at least one loading region of the at least one conveyor warewasher is controlled.

BRIEF DESCRIPTION OF THE DRAWINGS

Example embodiments of the solution according to the invention are described in more detail in the following with reference to the drawings.

The figures show.

DETAILED DESCRIPTION

Figure 1:
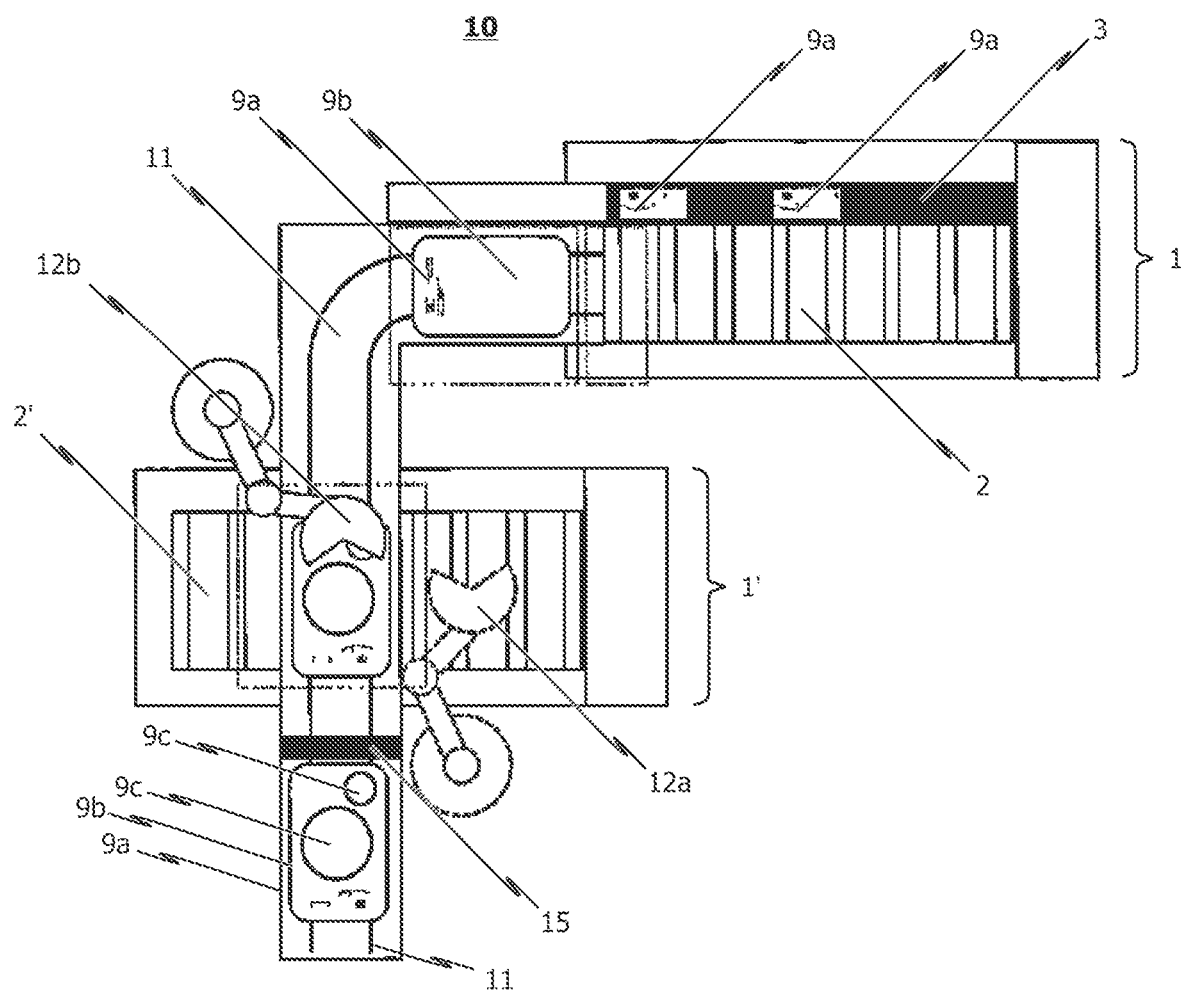
FIG. 1 schematically and in a plan view, the loading regions of a conveyor warewasher arrangement comprising two conveyor warewashers with a first exemplary embodiment of the loading system according to the invention.

Schematically and in a plan view, FIG. 1 shows the loading regions of two only partially shown conveyor warewashers 1.

A first of the two conveyor warewashers 1 has a conveyor apparatus (main conveyor belt 2, cutlery conveyor belt 3) for conveying washware 9a, 9b through the conveyor warewasher 1 in a conveying direction. The conveyor apparatus is configured in particular to allow a plurality of types of washware arranged next to one another to be treated simultaneously in the treatment zones of the conveyor warewasher 1 and thus make the entire washing and rinsing process more efficient, as a result of which, in particular, the working time of the washing personnel can be decreased and the consumption of resources of the warewasher 1 can be reduced.

The other (second) of the two conveyor warewashers 1' also has a conveyor apparatus (main conveyor belt 2') for conveying washware 9c in a conveying direction through the conveyor warewasher 1'. The conveyor apparatus of this conveyor warewasher 1' is configured in particular to have only one type of washware treated in the treatment zones of the conveyor warewasher 1', although this should not be seen as a limitation of the invention.

The conveyor warewashers 1, 1' considered here each have at least one wash zone, such as a prewash zone and a main wash zone, which, looking in the conveying direction of the washware 9a, 9b, 9c, is arranged behind the prewash zone. Looking in the conveying direction, a postwash zone is preferably provided behind the at least one wash zone, and at least one final rinse zone, such as a fresh water final rinse zone and/or a pump final rinse zone, is provided behind the postwash zone. Viewed in the conveying direction of the washware 9a, 9b, 9c, the at least one final rinse zone is followed by a drying zone.

The respective zones of the conveyor warewashers 1, 1' can be separated from one another by separating curtains. It is also conceivable for the respective entrance tunnels of the conveyor warewashers 1, 1', which, looking in the conveying direction, are provided behind the corresponding loading region of the conveyor warewasher 1, 1', to be separated from the entrance of the conveyor warewasher 1, 1' by a separating curtain. Providing separating curtains can prevent washing liquid and final rinsing liquid from splashing out of, and steam escaping from, the conveyor warewasher 1, 1'.

The treatment zones of the conveyor warewashers 1, 1' have assigned spray nozzles. These spray nozzles are used to spray liquid onto the washware 9a, 9b, 9c to be treated as said washware is transported through the respective treatment zones by the conveyor apparatus. The individual spray systems of the treatment zone ensure that the washware 9a, 9b, 9c to be treated is sprayed from both the top and the bottom.

In the embodiment shown schematically in FIG. 1, a system 10 for loading the conveyor warewasher 1 is provided at the loading region of the conveyor warewashers 1, 1'. The loading system 10 comprises an associated feed conveyor belt 11, via which washware 9a, 9b, 9c can be delivered to the loading regions of the conveyor warewashers 1, 1'.

The loading system 10 according to the invention, which is schematically shown according to an exemplary embodiment in FIG. 1 in a plan view, further comprises a loading arrangement having at least two manipulators 12a, 12b to automatically load the conveyor warewashers 1 and, more specifically, respective tracks or regions of the conveyor belts of the conveyor warewashers 1, 1' with washware 9a, 9b, 9c, in particular of one the predetermined or determinable washware groups.

In the solution schematically shown in FIG. 1, a further first loading arrangement is provided, in particular, which is configured to automatically load the first conveyor warewasher 1, and more specifically a cutlery track 3 running parallel to a main conveyor belt 2 of the first conveyor warewasher 1, with washware 9a of the first washware group (i.e. with cutlery and/or pieces of cutlery made of a metal, in particular stainless steel).

It is further conceivable that a further second loading arrangement, which is configured to automatically load the first conveyor warewasher 1, and more specifically a tray track running parallel to the main conveyor belt 2 of the first conveyor warewasher 1, with washware 9b of the second washware group (i.e. with trays and tray-like articles made of a plastic material), is used as well.

In addition, in the exemplary embodiment shown in FIG. 1, the loading arrangement having the aforementioned two manipulators 12a, 12b is used, which is configured to automatically load the second conveyor warewasher 1', and more specifically the main conveyor belt 2 of the second conveyor warewasher 1', with washware 9c of the third washware group (i.e. with dishes made of porcelain or a porcelain-like material).

It is provided, for example, that, looking in the conveying direction of the feed conveyor belt 11, the loading arrangement having the two manipulators 12a, 12b is arranged upstream of the first and second further loading arrangement.

In the exemplary embodiment shown in FIG. 1, the loading arrangement has the aforementioned two manipulators 12a, 12b, each of which is configured in particular to grip washware 9c of the third washware group, remove it from the feed conveyor belt 11, and set it down at a predetermined or determinable dedicated position.

This predetermined or determinable dedicated position is a position in a region of the conveyor belt (conveyor belt 2') of the second conveyor warewasher 1', in particular in a region of the main conveyor belt 2' of the second conveyor warewasher 1'.

Alternatively, however, it is also generally conceivable for the predetermined or determinable dedicated position to be in a region that is preferably located outside the second conveyor warewasher 1' and serves as a placement region for forming a stack of dishes.

As can be seen from the plan view in FIG. 1, in the exemplary embodiment of the loading system 10 according to the invention, it is provided, for example, that the two manipulators 12*a*, 12*b* each have a gripper system with at least one set of gripping tongs.

As an alternative or in addition to a set of gripping tongs, however, it would also be conceivable for the gripper system to have at least one suction gripper.

It is generally advantageous for at least one manipulator 12*a*, 12*b* of the loading arrangement to be configured to use the gripper system in particular to grip washware 9*c* of the third washware group, remove it from the feed conveyor belt 11, and set it down at the predetermined or determinable dedicated position.

In this context, it is conceivable, for example, for the at least one manipulator 12*a*, 12*b* of the loading arrangement to have a starting position or waiting position, in which the gripper system of the manipulator 12*a*, 12*b* is arranged above the feed conveyor belt 11 such that, during transport, washware 9*c* of the third washware group is conveyed by the feed conveyor belt 11 into the gripping region of the at least one set of gripping tongs.

The gripper system of the at least one manipulator 12*a*, 12*b* of the loading arrangement advantageously has an assigned sensor system, which is configured to detect the presence of at least one washware piece 9*a*, 9*b*, 9*c*, and in particular at least one washware piece 9*c* of the third washware group, in the gripping region of the at least one set of gripping tongs.

The loading system 10 is preferably associated with a control device, which is configured to initiate gripping by the at least one set of gripping tongs when the sensor system associated with the gripper system determines that at least one washware piece 9*a*, 9*b*, 9*c*, and in particular at least one washware piece 9*c* of the third washware group, is located in the gripping region of the at least one set of gripping tongs.

According to advantageous implementations, the control device is preferably further configured to actuate the at least one manipulator 12*a*, 12*b* of the loading arrangement such that said manipulator removes the at least one washware piece gripped by the gripper system from the feed conveyor belt 11 and sets it down at a predetermined or determinable dedicated position.

It is generally useful for the gripper system of the at least one manipulator 12*a*, 12*b* to in particular have an assigned positioning aid with at least one guide element, wherein the at least one guide element is configured to preferably guide only washware 9*c* of the third washware group delivered via the feed conveyor belt 11 in the direction of the gripping region of the at least one set of gripping tongs of the gripper system.

The exemplary embodiment of the loading system 10 according to FIG. 1 further comprises a detection system 15, in particular an optical one, which is configured to detect at least one of the following parameters of the washware 9*a*, 9*b*, 9*c* on the feed conveyor belt 11 when delivering the washware to the at least one loading region of the at least one conveyor warewasher:

i) a type of the washware 9*a*, 9*b*, 9*c*, and/or a relative position of the washware 9*a*, 9*b*, 9*c* on the feed conveyor belt 11;

ii) a degree of soiling of the washware 9*a*, 9*b*, 9*c*; and/or iii) an order of the washware 9*a*, 9*b*, 9*c* and/or an alignment of the washware 9*a*, 9*b*, 9*c* relative to the feed conveyor belt 11.

The detection system 15 has an assigned evaluation device, which is configured to control the delivery of the washware 9*a*, 9*b*, 9*c* to the at least one loading region of the conveyor warewashers 1, 1' as a function of at least one of the parameters detected by means of the detection system 15 and/or to actuate the at least one manipulator 12*a*, 12*b* of the loading arrangement.

The detection system 15 is configured in particular to detect at least one type of washware of the following types of washware when delivering the washware 9*a*, 9*b*, 9*c* to the at least one loading region of the at least one conveyor warewasher 1, 1', in particular on the basis of the size, the shape, and/or the material of the washware 9*a*, 9*b*, 9*c*:

a first washware type comprising cutlery and/or pieces of cutlery made of a metal, in particular stainless steel;

a second washware type comprising containers, in particular Gastronorm (GN) containers and/or pots made of a metal, in particular stainless steel;

a third washware type comprising trays or tray-like articles made of a plastic material; and a fourth washware type comprising dishes, in particular plates, cups, and/or bowls, made of porcelain, a porcelain-like material, or earthenware; and/or a fifth washware type comprising dishes and/or glasses, in particular drinking glasses, made of glass or a glass-like material.

Here, the evaluation device is configured in particular to actuate the at least one manipulator 12*a*, 12*b* of the loading arrangement as a function of a detected washware type in such a manner that the washware of the detected washware type is removed from the feed conveyor belt 11 by the at least one manipulator 12*a*, 12*b* and placed on a conveyor track 2, 2', 3, in particular one that is assigned to the detected washware type, of the at least one conveyor warewasher 1, 1'.

Alternatively or additionally, the evaluation device is configured to interrupt or prohibit (i.e. by stopping the feed conveyor belt 11) a delivery of a washware piece to the loading arrangement when the detection system 15 detects that the washware piece does not belong to a predetermined or determinable washware type or when the washware is not allocable to a predetermined or determinable washware type with the detection system 15.

According to further developments, the detection system 15 is configured to detect a degree of soiling of the washware 9*a*, 9*b*, 9*c* when feeding the washware 9*a*, 9*b*, 9*c* to the at least one loading region of the at least one conveyor warewasher 1, 1', wherein the evaluation device is configured to allow or interrupt the delivery of the washware 9*a*, 9*b*, 9*c* to the loading arrangement as a function of the detected degree of soiling.

Alternatively or additionally, the evaluation device is configured to acuate the at least one manipulator 12*a*, 12*b* of the loading assembly as a function of the degree of soiling detected such that the washware 9*a*, 9*b*, 9*c* of the at least one manipulator 12*a*, 12*b* is removed from the feed conveyor belt 11 and—as a function of the degree of soiling detected—placed either on a conveyor track 2, 2', 3 of the at least one conveyor warewasher 1, 1' or into a storage region external to the at least one conveyor warewasher 1, 1', and in particular at a precleaning station.

It is conceivable for the detection system 15 to be configured to detect a degree of soiling of the washware 9a, 9b, 9c when delivering the washware 9a, 9b, 9c to the at least one loading region of the at least one conveyor warewasher 1, 1', wherein the evaluation device is configured to allow or interrupt the delivery of the washware 9a, 9b, 9c to the loading arrangement as a function of the degree of soiling detected, wherein the evaluation device is further configured to interrupt the delivery of a washware piece to the loading arrangement when a degree of soiling is detected on the washware that exceeds a predetermined threshold value.

As already indicated and shown in FIG. 1, the feed conveyor belt 11 is configured in particular to deliver the washware 9a, 9b, 9c in batches to the at least one loading region of the at least one conveyor warewasher 1, 1', wherein each batch preferably comprises a tray 9b, optionally with washware placed or stored on the tray 9b, in particular at least one place setting.

Here, the detection system 15 is configured in particular to detect the at least one parameter of the washware 9a, 9b, 9c per batch, wherein the evaluation device is configured to allow or interrupt the delivery of the batch to the loading arrangement as a function of the detected parameter of a batch.

Alternatively or additionally, the detection system 15 is configured to detect an order of the washware 9a, 9b, 9c per batch when delivering the washware 9a, 9b, 9c by batch to the at least one loading region of the at least one conveyor warewasher 1, 1', wherein the evaluation device is configured to allow the delivery of the batch of the washware 9a, 9b, 9c to the loading arrangement as a function of the order detected, wherein the evaluation device is preferably configured in particular to allow the delivery of the batch of the washware 9a, 9b, 9c to the loading arrangement when the detection system 15 detects that the washware 9a, 9b, 9c is scattered in the batch.

The evaluation device is configured in particular to prohibit or interrupt the delivery of the batch of the washware 9a, 9b, 9c to the loading arrangement when the detection system 15 detects that a predetermined or determinable number of washware pieces is present in the batch in an overlapping manner at least in regions.

It is also conceivable that the detection system 15 is configured to detect an alignment of at least one of the washware pieces 9a, 9b, 9c relative to the feed conveyor belt 11 when delivering the washware 9a, 9b, 9c to the at least one loading region of the at least one conveyor warewasher 1, 1', wherein the evaluation device is configured to allow or interrupt the delivery at least of the at least one washware piece to the loading arrangement as a function of the detected alignment of the at least one washware piece relative to the feed conveyor belt 11, wherein the evaluation device is configured in particular to not allow or to interrupt the delivery to the loading arrangement when the detection system 15 detects that the at least one washware piece deviates from at least one predetermined or determinable target alignment.

Figure 2:
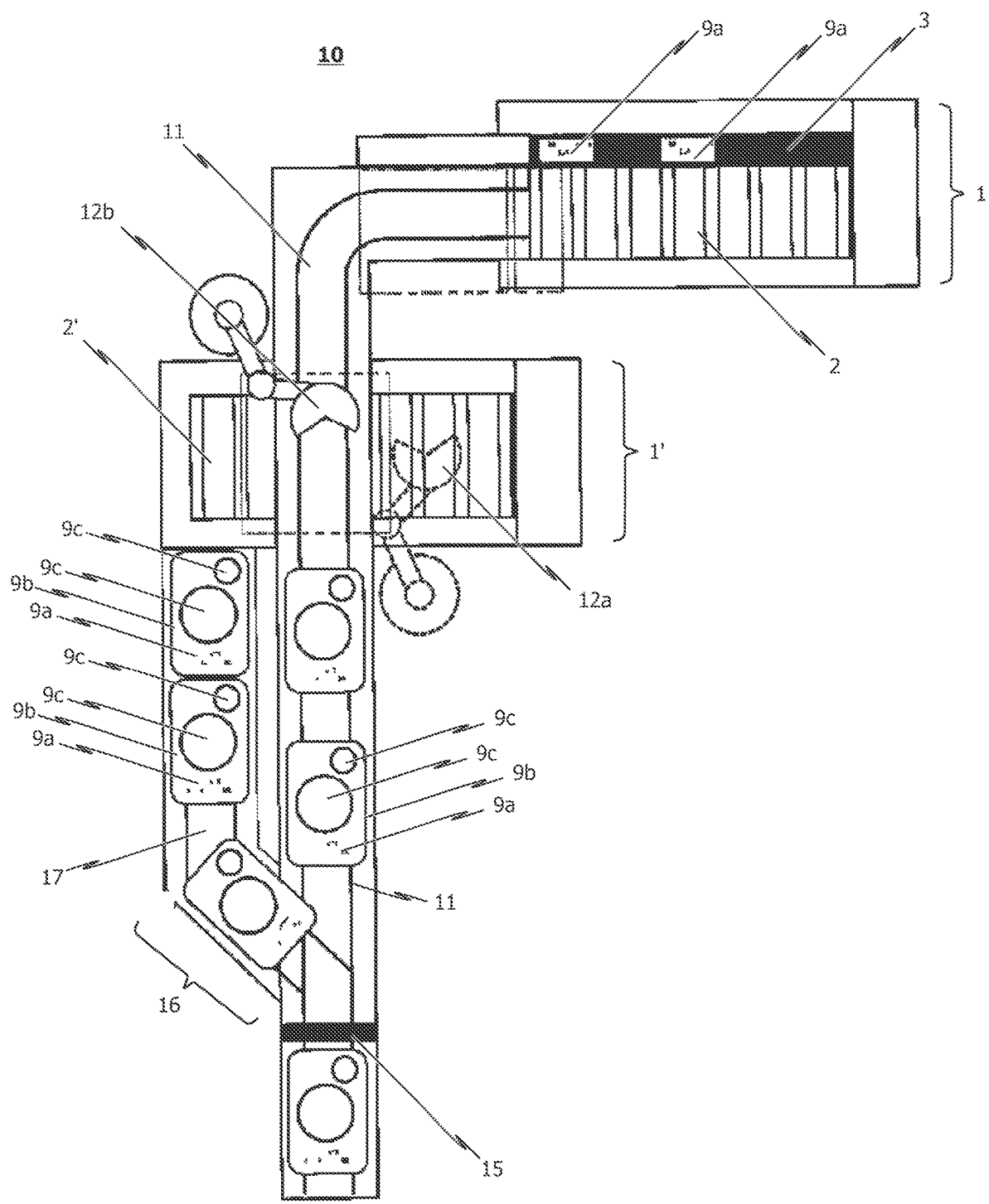
FIG. 2 schematically and in a plan view, the loading regions of a conveyor warewasher arrangement comprising two conveyor warewashers with a second exemplary embodiment of the loading system according to the invention.

Schematically and in a plan view, FIG. 2 shows the loading regions of a conveyor warewasher arrangement comprising two conveyor warewashers 1, 1' with a second exemplary embodiment of the loading system 10 according to the invention.

The second embodiment of the exemplary loading system 10 according to FIG. 2 differs from the first embodiment according to FIG. 1 in particular in that, in the second embodiment, the feed conveyor belt 11 has an assigned discharge switch 16, which is preferably arranged upstream of the at least one loading region of the at least one conveyor warewasher 1, 1' and downstream of the detection system 15 and is configured to discharge as needed at least one washware piece, and in particular washware pieces 9a, 9b, 9c by batch, out of the feed conveyor belt 11.

Here, the evaluation device is configured to actuate the discharge switch 16 when a delivery of at least one washware piece to the loading arrangement is not allowable or is to be interrupted.

The discharge switch 16 is configured in particular to discharge as needed at least one washware piece, and in particular washware pieces 9a, 9b, 9c by batch, out of the feed conveyor belt 11 into an outlet region 17, wherein the outlet region 17 is preferably configured for precleaning, in particular manually, of the washware 9a, 9b, 9c that has been discharged into the outlet region 17.

Figure 3:
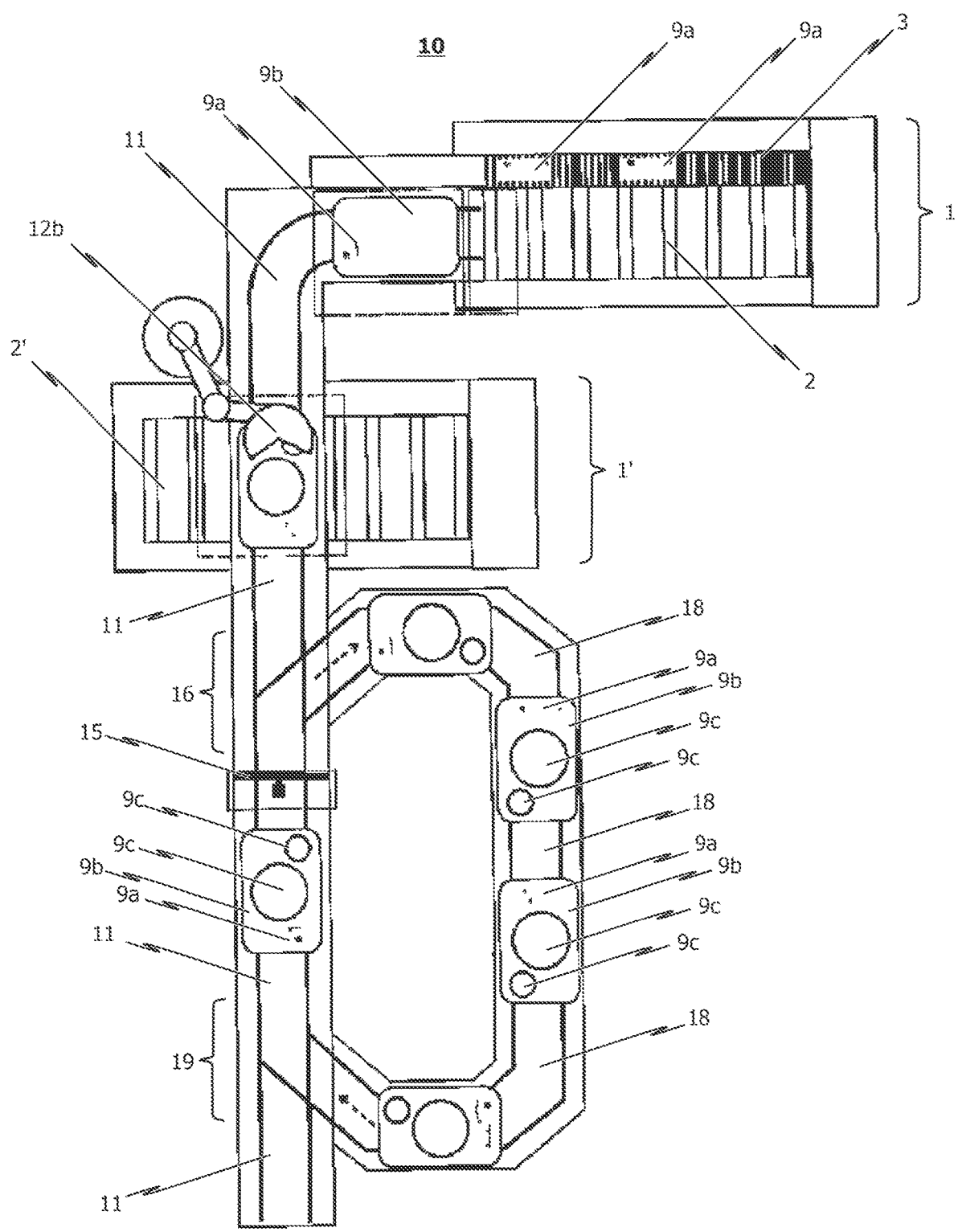
FIG. 3 schematically and in a plan view, the loading regions of a conveyor warewasher arrangement comprising two conveyor warewashers with a third exemplary embodiment of the loading system according to the invention.

Schematically and in a plan view, FIG. 3 shows the loading regions of a conveyor warewasher arrangement comprising two conveyor warewashers 1, 1' with a third exemplary embodiment of the loading system 10 according to the invention.

The second embodiment of the exemplary loading system 10 according to FIG. 3 differs from the first embodiment according to FIG. 2 in particular in that the discharge switch 16 is configured to discharge as needed at least one washware piece, and in particular washware pieces 9a, 9b, 9c by batch, out of the feed conveyor belt 11 into a return conveyor belt 18, wherein the return conveyor belt 18 is configured at least in regions for precleaning, in particular manually, of the at least one washware piece that has been discharged into the return conveyor belt 18.

In the embodiment shown in FIG. 3, an upstream end region of the return conveyor belt 18 is connected to an in-feed switch 19 in a conveying manner for the loading, at least as needed, of the at least one precleaned washware piece into the feed conveyor belt 11, wherein the in-feed switch 19 preferably leads into the feed conveyor belt 11 upstream of the detection system 15.

In principle, it is also conceivable in the first embodiment of the loading system 10 according to the invention that the feed conveyor belt 11 has an assigned in-feed switch 19, which is configured to load as needed at least one washware piece and in particular washware pieces 9a, 9b, 9c by batch, into the feed conveyor belt 11, wherein the in-feed switch 19 preferably leads into the feed conveyor belt 11 upstream of the detection system 15 and wherein the in-feed switch 19 preferably connects in a conveying manner a region that is configured for manual precleaning to the feed conveyor belt 11.

The invention is not limited to the embodiments shown in the drawings, but results when all of the features disclosed herein are considered together.

In this context, it is conceivable in particular that cutlery pieces from the washware delivered via the feed conveyor belt 11 are removed, for example with the aid of a controllable magnet, upstream of the detection system 15—looking in the conveying direction of the feed conveyor belt—wherein the removed cutlery pieces are then preferably automatically inserted into a cutlery track of a conveyor warewasher 1, 1'.

Furthermore, according to further developments, the evaluation device is configured to coordinate the manipulators of the loading arrangement accordingly so that, using the washware type detected by the detection system 15, the corresponding type of washware can be removed from the feed conveyor belt 11 by the appropriate manipulator 12a, 12b.

What is claimed is:

1. A system for loading at least one conveyor warewasher with washware, wherein the system comprises:
 a feed conveyor belt for delivering the washware to at least one loading region of the at least one conveyor warewasher;
 a loading arrangement having at least one manipulator, which is configured to automatically remove the washware from the feed conveyor belt and place it on at least one conveyor track of the at least one conveyor warewasher; and
 a detection system, configured as an optical detection system, which is configured to detect at least one of the following parameters of the washware on the feed conveyor belt when delivering the washware to the at least one loading region of the at least one conveyor warewasher:
  i) a type of the washware;
  ii) a relative position of the washware on the feed conveyor belt;
  iii) a degree of soiling of the washware;
 wherein the detection system has an assigned evaluation device, which is configured to control the delivery of the washware to the at least one loading region as a function of the at least one parameter detected by the detection system and/or to actuate the at least one manipulator of the loading arrangement;
 wherein the detection system is configured to detect the type of the washware when the washware is being delivered to the at least one loading region;
 wherein the evaluation device is configured to stop the feed conveyor belt when the detection system detects that the washware does not belong to a predetermined or determinable washware type.

2. The system according to claim 1,
 wherein the detection system is configured to detect at least one type of washware of the following types of washware when delivering the washware to the at least one loading region of the at least one conveyor warewasher, on the basis of the size, the shape, and/or the material of the washware:
  a first washware type comprising cutlery made of a metal;
  a second washware type comprising Gastronorm (GN) containers and/or pots made of a metal;
  a third washware type comprising trays or tray-like articles made of a plastic material;
  a fourth washware type comprising plates, cups, and/or bowls, made of porcelain, a porcelain-like material, or earthenware; and/or
  a fifth washware type comprising drinking cups, made of glass or a glass-like material,
 wherein the evaluation device is configured to actuate the at least one manipulator of the loading arrangement as a function of a detected washware type in such a manner that the washware of the detected washware type is removed from the feed conveyor belt by the at least one manipulator and placed on the at least one conveyor track, which is assigned to the detected washware type.

3. The system according to claim 1,
 wherein the detection system is configured to detect the degree of soiling of the washware when delivering the washware to the at least one loading region of the at least one conveyor warewasher, wherein the evaluation device is configured to actuate the at least one manipulator of the loading arrangement as a function of the degree of soiling detected such that the washware manipulated by the at least one manipulator is removed from the feed conveyor belt and—as function of the degree of soiling detected-placed either on the at least one conveyor track of the at least one conveyor warewasher or into a storage region external to the at least one conveyor warewasher.

4. The system according to claim 3, wherein the evaluation device is further configured to stop the feed conveyor belt when the degree of soiling that is detected on the washware exceeds a predetermined threshold value.

5. The system according to claim 4,
 wherein the feed conveyor belt is configured to deliver the washware in batches to the at least one loading region of the at least one conveyor warewasher, wherein each batch comprises a tray, wherein the detection system is configured to detect the at least one parameter of the washware in each batch.

6. The system according to claim 1, wherein the detection system is configured to detect an alignment of the washware relative to the feed conveyor belt when delivering the washware to the at least one loading region of the at least one conveyor warewasher, wherein the evaluation device is configured to stop the feed conveyor belt when the detection system detects that the alignment of the washware deviates from at least one predetermined or determinable target alignment.

7. An arrangement comprising at least one conveyor warewasher and one loading system according to claim 1.

8. A system for loading at least one conveyor warewasher with washware, wherein the system comprises:
 a feed conveyor belt for delivering the washware to at least one loading region of the at least one conveyor warewasher;
 a loading arrangement having at least one manipulator, which is configured to automatically remove the washware from the feed conveyor belt and place it on at least one conveyor track of the at least one conveyor warewasher; and
 a detection system, configured as an optical detection system, which is configured to detect at least one of the following parameters of the washware on the feed conveyor belt when delivering the washware to the at least one loading region of the at least one conveyor warewasher:
  i) a type of the washware;
  ii) a relative position of the washware on the feed conveyor belt;
  iii) a degree of soiling of the washware;
 wherein the detection system has an assigned evaluation device, which is configured to control the delivery of the washware to the at least one loading region as a function of the at least one parameter detected by the detection system and/or to actuate the at least one manipulator of the loading arrangement;
 wherein the detection system is configured to detect the degree of soiling of the washware when the washware is being delivered to the at least one loading region;

wherein the evaluation device is configured to stop the feed conveyor belt when the detection system detects that the degree of soiling exceeds a predetermined threshold value.

9. A system for loading at least one conveyor warewasher with washware, wherein the system comprises:
- a feed conveyor belt for delivering the washware to at least one loading region of the at least one conveyor warewasher;
- a loading arrangement having at least one manipulator, which is configured to automatically remove the washware from the feed conveyor belt and place it on at least one conveyor track of the at least one conveyor warewasher; and
- a detection system, configured as an optical detection system, which is configured to detect at least one of the following parameters of the washware on the feed conveyor belt when delivering the washware to the at least one loading region of the at least one conveyor warewasher:
  - i) a type of the washware;
  - ii) a relative position of the washware on the feed conveyor belt;
  - iii) a degree of soiling of the washware;

wherein the detection system has an assigned evaluation device, which is configured to control the delivery of the washware to the at least one loading region as a function of the at least one parameter detected by the detection system and/or to actuate the at least one manipulator of the loading arrangement;

wherein the detection system is configured to detect an alignment of the washware relative to the feed conveyor belt when the washware is being delivered to the at least one loading region;

wherein the evaluation device is configured to stop the feed conveyor belt when the detection system detects that the alignment of the washware deviates from at least one predetermined or determinable target alignment.

* * * * *